United States Patent [19]

Ito et al.

[11] Patent Number: 4,578,313

[45] Date of Patent: Mar. 25, 1986

[54] POWDER FOR MAGNETIC RECORDING MEDIA AND PROCESS FOR MANUFACTURING THE SAME

[75] Inventors: Takeo Ito, Yokohama; Tadashi Ido, Ebina; Hajime Takeuchi; Minoru Hashimoto, both of Yokohama; Tatsumi Maeda, Kawasaki; Masashi Awa, Yokohama, all of Japan

[73] Assignee: Tokyo Shibauru Denki Kabushiki Kaisha, Japan

[21] Appl. No.: 536,855

[22] Filed: Sep. 28, 1983

[30] Foreign Application Priority Data

Oct. 19, 1982 [JP] Japan ................ 57-182131

[51] Int. Cl.$^4$ .................. B32B 19/02; G11B 5/712
[52] U.S. Cl. .................... 428/403; 428/407; 428/408; 428/480; 428/694; 428/900; 427/130; 427/228; 148/105
[58] Field of Search ............ 428/403, 407, 408, 900, 428/694, 480; 427/228, 130; 252/62.53, 62.54, 62.63; 148/105

[56] References Cited

U.S. PATENT DOCUMENTS

| | | | |
|---|---|---|---|
| 3,498,748 | 3/1970 | Greiner | 23/200 |
| 3,634,254 | 1/1972 | Micheli | 252/62.63 |
| 3,989,648 | 11/1976 | Lenhard et al. | 428/403 |
| 4,192,902 | 3/1980 | Lu | 427/130 |
| 4,323,596 | 4/1982 | Buxbaum et al. | 428/694 |
| 4,332,863 | 6/1982 | Hosaka | 428/900 |
| 4,361,621 | 11/1982 | Isobe et al. | 428/900 |
| 4,391,893 | 7/1983 | Hendricks | 428/407 |
| 4,404,260 | 9/1983 | Shibata | 427/132 |
| 4,434,009 | 2/1984 | Banba | 428/407 |

FOREIGN PATENT DOCUMENTS 554804  3/1975  Japan .

*Primary Examiner*—George F. Lesmes
*Assistant Examiner*—William M. Atkinson
*Attorney, Agent, or Firm*—Finnegan, Henderson, Farabow, Garrett & Dunner

[57] ABSTRACT

A powder for a magnetic recording medium comprising a plurality of magnetic particles and a coating covering the surfaces of the magnetic particles. The coating is a residue resulting from the thermal decomposition of an organic material. The powder is manufactured by applying one or more organic materials to the surfaces of a plurality of magnetic particles by dispersing the magnetic particles in a solution containing the organic material. The magnetic particles, having the organic material as a coating, are separated from the solution, and the magnetic particles are heated to a temperature at which the organic material decomposes.

9 Claims, 1 Drawing Figure

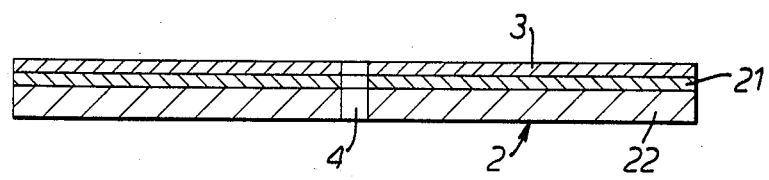

POWDER FOR MAGNETIC RECORDING MEDIA AND PROCESS FOR MANUFACTURING THE SAME

BACKGROUND OF THE INVENTION

The invention relates to a powder for a magnetic recording medium and a process for manufacturing the same and, more particularly, to a dispersive powder suitable for a high density vertical magnetic recording medium.

Generally, a conventional magnetic recording is a horizontal recording that utilizes residual magnetism in parallel with the direction of the recording medium. The recording medium, for horizontal recordings, has a dendrite magnetic powder, such as $\gamma$-iron oxide ($\gamma$-$Fe_2O_3$), chromium oxide ($Cr_2O_3$) and $\gamma$-iron oxide covered with a cobalt layer ($\gamma$-$Fe_2O_3$-Co), as a magnetic layer on a base material in parallel orientation with the direction of the track of the recording medium. This kind of recording medium, however, has the defect that for a short wave signal the recording-reproducing characteristic of the recording medium deteriorates, because the recording medium tends to increase the self-demagnetizing field of the medium at high density recording. In order to successfully achieve high density recording without self-demagnetizing, it is necessary that the coercive force of the medium should be increased and the thickness of the magnetic layer should be thinner. However, at the present time, it is difficult to strengthen the coercive force of the magnetic layer, and it is undesirable to make the magnetic layer thinner, due to the resulting deterioration of the reproduced signal.

To avoid these problems and disadvantages, a vertical magnetic recording has been proposed for high density recording. Vertical magnetic recording uses the residual magnetism existing in a vertical direction relative to the track of the magnetic recording medium. This method of magnetic recording is suitable for high density recording, because as the recording density increases, the self-demagnetizing field decreases. For vertical magnetic recording, a recording medium having a magnetic layer of a cobalt-chromium alloy produced by sputtering is known; similarly, a recording medium produced by coating a base with a solution including a binder and a magnetic powder is known. In particular, the coating method uses a metal oxide magnetic powder having excellent corrosion and abrasion resistance, and surface flatness, as well as high productivity. Accordingly, the recording medium produced by the coating method is regarded as a dominant medium for use in vertical magnetic recording.

When the recording media has a coating layer of a magnetic powder, it is not necessary to orient entirely the magnetization axis for magnetization of the magnetic powder normal to the base of the recording media; but, good orientation of the magnetization axis for magnetization is still desirable. A hexagonal ferrite magnetic powder, such as barium ferrite, strontium ferrite, calcium ferrite, lead ferrite, and mixtures thereof, in solid solution, is easy to orient in a direction perpendicular to the surface of the recording media. These magnetic powders have hexagonal plate-like particles, and they have a magnetization axis for magnetization in a direction perpendicular to the surface of the particle. Accordingly, these magnetic powders are suitable for use as vertical magnetic recording media, because the surfaces of the powder particles are easily oriented by coating the base of the media with a solution of a binder mixed with the particles. The magnetization axis for magnetization of the particles is oriented perpendicularly to the surface of the recording media by either magnetic orientation or mechanical orientation treatment.

However, as these particles overlap each other because of their strong cohesion resulting from mixing the binder with the particles, it is difficult to disperse the particles uniformly in the coating solution. Consequently, the signal to noise characteristic of the recording medium made by coating the solution on the base is deteriorated.

SUMMARY OF THE INVENTION

It is, therefore, an object of the present invention to provide a powder for a magnetic recording medium that is suitable for use in vertical magnetic recording methods, and to provide a process for manufacturing the same.

It is another object of the present invention to provide a powder, having a high dispersion, for a magnetic recording medium that is suitable for use in high density recording methods, and to provide a process for manufacturing the same.

To achieve these objectives, the present invention provides a powder for a magnetic recording medium comprising a plurality of magnetic particles and a coating covering the surfaces of the magnetic particles, the coating being a residue resulting from the thermal decomposition of an organic material.

The present invention also provides a method for manufacturing a powder for a magnetic recording medium comprising the steps of applying one or more organic materials to the surfaces of a plurality of magnetic particles by dispersing the magnetic particles in a solution containing the organic material; separating the magnetic particles having the organic material as a coating from the solution; and heating the magnetic particles having the organic material as a coating to a temperature at which the organic material thermally decomposes.

The present invention further provides a magnetic medium comprising a base made of a nonmagnetic material and a magnetic layer on the base having a plurality of magnetic particles and an organic binder, the magnetic particles being covered with a residue resulting from the thermal decomposition of an organic material.

BRIEF DESCRIPTION OF THE DRAWING

The accompanying drawing, which is incorporated in and constitutes a part of the specification, illustrates one embodiment of the invention and, together with the description, serves to explain the principles of the invention.

The FIGURE is a sectional view of a magnetic recording disk of the present invention taken along a diameter of the disk.

DESCRIPTION OF THE PREFERRED EMBODIMENT

Referring now to the FIGURE, a magnetic recording disk 1 of the present invention is shown. The magnetic recording disk 1 comprises a base 2 made of a non-magnetic material, and a magnetic layer 3 on the base 2. The base 2 and magnetic layer 3 have a hole 4, which couples with the drive shaft (not shown), to drive the disk 1. The base 2 comprises a polyester film 21 and a hard base 22, which is made of a plastic. The magnetic layer 3 includes a powder made in accordance with this invention and binder to keep the powder on the polyester film 21. The disk (1) has good reproducing characteristics, such as a reproducing output power of 112 μVp-p (peak to peak), and a S/N ratio of about −75 dB.

The inventors of the present invention have discovered that the dispersion of a magnetic powder, in a coating solution, is improved by heating a plurality of particles, covered by an organic material, to the temperature at which thermal decomposition of the organic material occurs. Although the reason why the magnetic powder has a uniform dispersion is not clearly understood, it is assumed, without being bound by theory, that cohesion among the magnetic powder is prevented, and the surface of the powder becomes lyophilic to oil, when the surface of the magnetic particles is covered with a residue resulting from the thermal decomposition of an organic material that coats the particles.

The residue resulting from the thermal decomposition of the organic material is preferably a carbonaceous liquid or a carbonaceous solid. Although the composition and structure of the residues are different depending upon the particular organic material used, the residue mainly includes unsaturated multiple bonds, aromatic rings, or multiple aromatic rings.

Any kind of organic material can be used to produce the residue so long as the organic material is capable of producing a carbonaceous material by thermal decomposition. Organic materials, having the elements of oxygen, nitrogen, sulfur, phosphorus, silicon, boron, aluminum, titanium, zirconium, and a halogen, in a carbon chain or a permutation radical, can be used to obtain the residue.

Preferably, the magnetic particles include $\gamma$-$Fe_2O_3$ particles, $\gamma$-$Fe_2O_3$ particles containing cobalt partially permutating the iron in the $\gamma$-$Fe_2O_3$, cobalt-nickel-iron alloy particles, cobalt-iron alloy particles, $BaO \cdot nFe_2O_3$ particles, $SrO \cdot nFe_2O_3$ particles, and hexagonal ferrite particles shown by the formula

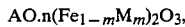

$$AO \cdot n(Fe_{1-m}M_m)_2O_3,$$

wherein n is approximately 5.0 to 6.0 and m is approximately 0 to 0.2, A is at least one element selected from the group consisting of barium, strontium, calcium, and lead and M means at least one element selected from the group consisting of cobalt, titanium, nickel, manganese, copper, zinc, indium, germanium, and niobium. Preferably, the hexagonal ferrite particles have a mean particle size of about 0.005 to 0.3 μm and a coercive force of about 200 to 2000 Oe, which is suitable for use in a high density vertical magnetic recording medium.

It has been discovered that hexagonal ferrite particles, having a mean particle size smaller than 0.005 μm, do not have enough magnetism to be able to record, and hexagonal ferrite particles, having a mean particle size larger than 0.3 μm, are not suitable for high density magnetic recording. Particles, having a coercive force smaller than 200 Oe, cannot increase the recording density; particles having a coercive force larger than 2000 Oe, saturate the magnetic recording head. Consequently, particles of hexagonal ferrite, having a reduced coercive force suitable for vertical magnetic recording, are desirable as the particles to be used in the invention because, in general, the hexagonal ferrite has a strong coercive force. A reduction in coercive forces is achieved by substituting for some of the atoms of hexagonal ferrite various other atoms.

Preferably, the amount of residue on the magnetic particles is about 0.1 to 5 wt % of the magnetic particles. If the residue amount is less than about 0.1 wt %, then the particles, having the residue, are not uniformly dispersed in the coating solution. Similarly, if the residue amount is more than 5 wt %, then the residue prevents the dispersion of the particles and, accordingly, deteriorates the endurance of the magnetic coating on the base.

The powder of the present invention is produced by a process initially applying one or more organic materials to the surfaces of a plurality of magnetic particles by dispersing the magnetic particles in a solution containing the organic material. It is preferred that as much of the particle surfaces be covered with the organic materials as is possible. The magnetic particles having the organic material coating are separated from the solution. Preferably, the separation occurs by filtering the particles. The magnetic particles having the organic material coating are heated to a temperature at which the organic material decomposes.

The step of applying the organic materials to the surfaces of magnetic particles can be done by directly adding the magnetic particles to the solution containing the organic materials, or by mixing a suspension of magnetic particles with the solution containing the organic materials. It is desirable that the organic materials cover the surface of the particles by molecular adsorption. However, it is also permitted to have the organic materials adhere to the surface of the particles by precipitation.

Any organic material, which can be dissolved by water or an organic solvent, or which can be dispersed in water or an organic solvent, can be used in the present invention. However, an organic material that is incapable of uniformly covering the surface of the particles is not preferably used, since the residue, resulting from the thermal decomposition of such an organic material, does not uniformly cover the surfaces of the particles.

The preferred organic materials that are used in the present invention are as follows: higher alcohols, such as octanol, decanol, cetanol; higher fatty acids, such as myristic acid, stearic acid, and oleic acid; natural fats and fatty oils, such as linseed oil, coconut oil, and soybean oil; natural materials, such as rosin, glue, camphor, starch, and lecithin; water soluble polymers, such as polyacrylic amide, polyvinyl alcohol, polyacrylic acid, and resor resin; resins, such as epoxy resin, phenol resin, acrylic oligomer, urethane resin, urea resin, melamine resin, furan resin, asphalt, and pitch; organic materials, such as phenol, amine, acid anhydride, cyanate, nitryl, and amid; surface active agents; coupling agents containing titanium, aluminum, zirconium, silicon, phosphorus, and boron; and various chelate compounds. In particular, water soluble polymers and natural resins are suitable. One or more organic materials may be used in combination as the organic material for the present invention.

In the present invention, the powder is preferably produced in accordance with the following method. At first, about 0.1 to 5 grams of at least one of the organic materials described above is dissoved in about 1 liter of a solvent, and additionally, about 20 to 200 grams of magnetic particles are mixed in the solvent and organic materials. The magnetic particles, having their surface covered by the organic material are separated from the solution by filtering. The magnetic particles are heated so that the surfaces of the particles are covered with the residue resulting from the thermal decomposition of the organic material. The particles are heated, in an oven, at the temperature at which the organic material thermally decomposes.

The temperature of thermal decomposition and the atmosphere vary depending upon the organic materials used. For example, the termperature of heat treatment is about 300 to 600° C. for an organic material, such as phenol resin, having a high thermal decomposition temperature. However, the temperature of heat treatment is less than about 300° C. for an organic material, such as natural resin or higher alcohols, having a low thermal decomposition temperature. The heat treatment can be performed in every type of atmosphere, such as air, inert gas, and a vacuum. However, if an organic material is used, which has a residue that tends not to cover the surface of the particles, then the heat treatment is preferably done under a vacuum, an inert gas, or air having a low partial pressure of oxygen.

Although a wet method for manufacturing the magnetic powder of this invention is explained above, the magnetic powder can also be manufactured by a dry method. In the dry method, the magnetic powder of this invention can be produced by reacting a gas of the organic material on a heated magnetic particle.

Following are examples of the present invention, which are intended to be merely exemplary of the present invention.

EXAMPLE 1

One hundred grams (100 g) of barium ferrite magnetic particles, which are substituted by cobalt and titanium, and which have a coercive force of 850 Oe, a saturation magnetization of 58 emu/g, and mean size diameter of 0.1 μm, are added to one liter (1 l) of pure water. They are kneaded with each other until they become clay-like. While the particles are stirred in the solution, 100 grams of a water solution containing 5 wt % of polyvinyl alcohol is added to the particles to cover the surfaces of the magnetic particles with the polyvinyl alcohol. After the particles of barium ferrite are separated from the solution by filtering, the particles are heated at 280° C. in an oven, with 50 mmHg of air pressure. A powder, having 0.5 wt % of residue resulting from the thermal decomposition, is produced.

In order to measure the sedimentation volume of the powder, 5 grams of the powder, having the residue as described above, and 5 grams of an untreated powder are applied to a sedimentation tube with 50 milliliters of a toluene solution. The sedimentation volume of these powders are 18 milliliters and 28 milliliters, respectively. A smaller sedimentation volume for the powder having the residue coating than that of the powder without the residue coating indicates the lyophilic nature of the powder having the residue coating. Further, it means that the degree of dispersion for the powder of the present invention is good.

The producing method of the magnetic medium using the powder is as follows: 80 grams of the powder, having the residue coating, is mixed with 100 grams of a solution containing equal amounts of toluene and methyl ethyl ketone, and 4 grams of a dispersion agent, such as lecithin. The mixture is dispersed and mixed by a sand grinder for about 2 hours. 100 grams of a methyl-ethyl-ketone solution including 20 wt % of a material sold under the trademark VAGH by the Union Carbide Co., which material is a vinyl chloride-vinyl acetate copolymer, is added to the mixture. The mixture is then dispersed and again mixed by a sand grinder for about 1 hour. At last, the coating paint is prepared.

It is observed by microscopic examination of the film of the coating paint on a cover-glass that the maximum size of aggregating powder is about 1 μm. The result of the observation indicates that the barium ferrite magnetic particles are excellently dispersed in the coating paint. After the coating paint is coated on the surface of a polyester film, the magnetic medium is produced by drying the coating paint on the film by orientating the magnetic field.

EXAMPLE 2

By using a methyl-ethyl-ketone solution containing 5 wt % of rosin instead of a polyvinyl-alcohol solution, barium ferrite particles, having an organic coating of rosin, are produced. These particles are heated at a temperature of 450° C. in an oven. A powder, having 0.3 wt % amount of residue resulting from thermal decomposition, is produced. 100 grams of the powder is mixed with 4 grams of a dispersion material of phosphoric ester and 100 grams of a solution containing equal amounts of toluene and methyl-ethyl-ketone. The mixture is dispersed and mixed by a sand grinder for about 2 hours. After that, as in Example 1, a coating paint is produced by mixing the mixture with a vinyl chloride-vinyl acetate copolymer, and by dispersing and mixing them together.

As in Example 1, it is observed that the maximum size of aggregating powder is about 1 μm. As a result, a magnetic medium with 112 μVp-p of reproducing output power and −75 dB for 2 μm of wave length of recording wave S/N is obtained.

Other embodiments of the invention will be apparent to one skilled in the art from a consideration of this specification or practice of the invention disclosed herein. It is intended that the specification and examples be considered as exemplary only, with the true scope and spirit of the invention being indicated by the claims.

As it will be understood from the above explanation, the magnetic powder of the present invention has the advantages of:

(1) As the powder is uniformly dispersed in the coating paint, the magnetic medium using the powder has an improved S/N characteristic.

(2) As the surface of the magnetic particle is covered with the residue resulting from the thermal decomposition of the organic material, the amount of residue covering the surface of the magnetic particles is reduced in comparison with the amount of organic material that is coated by conventional methods, such as organic material covering or coupling treatments. As the result, undesirable phenomena, such as retarding of pot-life, by these materials isolating in binder resins are prevented.

What is claimed is:

1. A powder for a magnetic recording medium comprising:
   (a) a plurality of hexagonal ferrite magnetic particles having a mean diameter of about 0.005 to 0.3 microns and a coercive force of about 200 to 2000 Oe, and
   (b) a coating covering the surfaces of said magnetic particles, the coating being a carbonaceous residue resulting from the thermal decomposition of an organic material, the amount of said residue coating bring about 0.1 to about 5 wt. percent of the magnetic particles.

2. The powder for a magnetic recording medium according to claim 1, wherein the hexagonal ferrite magnetic particles are selected from the group consisting of barium ferrite, strontium ferrite, calcium ferrite, and lead ferrite.

3. The powder for a magnetic recording medium according to claim 1, wherein the organic material is selected from the group consisting of higher alcohols, higher fatty acids, natural fats, fatty oils, water soluble polymers, and resins.

4. The powder for a magnetic recording medium according to claim 1, wherein the organic material is polyvinyl alchol.

5. The powder for a magnetic recording medium according to claim 1, wherein the organic material is rosin.

6. A method for manufacturing a powder for a magnetic recording medium comprising the steps of:
   (a) applying one or more organic materials to the surfaces of a plurality of hexagonal ferrite magnetic particles by dispersing said particles in a solution containing said organic material;
   (b) separating the magnetic particles having the organic material as a coating from the solution; and
   (c) heating the magnetic particles having the organic coating thereon to a temperature at which the organic material thermally decomposes to form a carbonaceous residue coating of about 0.1 to about 5 wt. % of said magnetic particles;
   wherein the mean diameter and the coercive force of the hexagonal ferrite particles are about 0.005 to 0.3 microns and about 200 to 2000 Oe, respectively.

7. The method for manufacturing a powder for a magnetic recording method according to claim 6, wherein the separating step is performed by filtering techniques.

8. A magnetic recording medium comprising:
   (a) a base made of a nonmagnetic material; and
   (b) a magnetic layer on the base having a plurality of hexagonal ferrite magnetic particles and an organic binder, the magnetic particles being covered with a carbonaceous residue resulting from the thermal decomposition of an organic material, the amount of the residue coating being about 0.1 to about 5 wt. % of the magnetic particles, the means diameter and coercive force of the magnetic particles being about 0.005 to 0.3 microns and about 200 to 2000 Oe, respectively.

9. The magnetic recording medium according to claim 8, wherein the base includes a hard base made of a plastic and a polyester film overlying the hard base.

* * * * *

UNITED STATES PATENT AND TRADEMARK OFFICE
CERTIFICATE OF CORRECTION

PATENT NO. : 4,578,313

DATED : March 25, 1986

INVENTOR(S) : Ito, Takeo; Yokohama; Ido, Tadashi; Ebina; Takeuchi, Hajime

It is certified that error appears in the above-identified patent and that said Letters Patent is hereby corrected as shown below:

Claim 1, line 11; "bring" should be --being--

Claim 4, line 3; "alchol" should be --alcohol--.

Signed and Sealed this

Ninth Day of September 1986

[SEAL]

Attest:

DONALD J. QUIGG

Attesting Officer

Commissioner of Patents and Trademarks